United States Patent
Tsukihashi et al.

(10) Patent No.: US 7,529,172 B2
(45) Date of Patent: May 5, 2009

(54) OPTICAL DISK RECORDING AND PLAYBACK DEVICE

(75) Inventors: Akira Tsukihashi, Ora-gun (JP); Tsuyoshi Yamamoto, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 617 days.

(21) Appl. No.: 11/360,780

(22) Filed: Feb. 23, 2006

(65) Prior Publication Data
US 2006/0193226 A1 Aug. 31, 2006

(30) Foreign Application Priority Data
Feb. 28, 2005 (JP) .............................. 2005-053585

(51) Int. Cl.
*G11B 7/00* (2006.01)
(52) U.S. Cl. ........................ 369/94; 369/59.11; 369/116
(58) Field of Classification Search ................ 369/47.5, 369/53.26, 94, 116, 59.11
See application file for complete search history.

(56) References Cited

U.S. PATENT DOCUMENTS

| | | | |
|---|---|---|---|
| 5,768,221 A * | 6/1998 | Kasami et al. ................. | 369/14 |
| 6,160,787 A | 12/2000 | Marquardt, Jr. et al. | |
| 6,320,840 B1 | 11/2001 | Oh et al. | |
| 6,826,139 B1 | 11/2004 | Oh et al. | |
| 6,931,654 B1 | 8/2005 | Oh et al. | |
| 7,070,860 B2 | 7/2006 | Kobayashi et al. | |
| 7,172,991 B2 | 2/2007 | Anderson et al. | |
| 2003/0012115 A1* | 1/2003 | Akiyama et al. ....... | 369/112.02 |
| 2003/0117932 A1 | 6/2003 | Morishima et al. | |
| 2003/0179679 A1 | 9/2003 | Morishima | |

(Continued)

FOREIGN PATENT DOCUMENTS

CN 1210337 A 3/1999

(Continued)

OTHER PUBLICATIONS

State Intellectual Property Office of P.R. China, "Notification of First Office Action," (Feb. 10, 2006).

(Continued)

*Primary Examiner*—Thang V Tran
*Assistant Examiner*—Lixi Chow
(74) *Attorney, Agent, or Firm*—Pillsbury Winthrop Shaw Pittman LLP

(57) ABSTRACT

An optical disk recording and playback device comprises a first laser driving circuit that supplies a driving signal to a first laser diode, a second laser driving circuit that supplies a driving signal to a second laser diode, a signal recording pulse generating circuit that generates a signal recording pulse signal in accordance with a signal to be recorded on a signal recording layer, and outputs the signal recording pulse signal to the first laser driving circuit, and an image recording pulse generating circuit that generates an image recording pulse signal in accordance with a signal to form an image on an image recording layer, and outputs the image recording pulse signal to the second laser driving circuit. When recording of a signal to the signal recording layer and recording of an image to the image recording layer are simultaneously performed, the first laser diode and the second laser diode are controlled to prevent light emission from simultaneously occurring at recording levels.

4 Claims, 3 Drawing Sheets

U.S. PATENT DOCUMENTS

| | | | |
|---|---|---|---|
| 2004/0111473 A1 | 6/2004 | Lysenko et al. | |
| 2005/0135218 A1* | 6/2005 | Akiyama et al. | 369/112.02 |

FOREIGN PATENT DOCUMENTS

| CN | 1214144 | 4/1999 |
|---|---|---|
| CN | 1416114 A | 5/2003 |
| CN | 1469377 | 1/2004 |
| JP | 2002-203321 | 7/2002 |
| JP | 2003-203348 | 7/2003 |
| JP | 2003-272240 | 9/2003 |

OTHER PUBLICATIONS

State Intellelctual Property Office of P.R. China, Office Action dated May 18, 2007, (4 pages).

* cited by examiner

OPTICAL DISK RECORDING AND PLAYBACK DEVICE

CROSS-REFERENCE TO RELATED APPLICATION

The entire disclosure of Japanese Patent Application No. 2005-53585 including the specification, claims, drawings, and abstract is incorporated herein by reference.

BACKGROUND OF THE INVENTION

1. Field of the Invention

The present invention relates to an optical disk recording and playback device that is capable of recording a signal and forming a visible image on an optical disk by means of laser light applied from a laser diode provided in an optical pickup.

2. Description of the Related Art

In recent years, optical disk recording and playback devices for use with optical disks that are called DVDs (digital versatile disks) have become widely available. Such an optical disk recording and playback device is configured to be capable of being used not only with DVDs but also with CDs (compact disks). An optical pickup provided in such an optical disk recording and playback device capable of being used with both types of disk includes two types of laser diode that emit two different wavelengths of light, one of which emits laser light having a suitable wavelength for the recording density of DVDs, and the other of which emits laser light having a suitable wavelength for the recording density of CDs. Switching between the laser diodes is performed in accordance with the type of optical disk in use.

Transparent substrates of a DVD and a CD have significantly different thicknesses of 0.6 mm and 1.2 mm, respectively, as measured from a surface to a signal recording layer. For this reason, in a DVD and CD compatible optical pickup, different NAs (numerical apertures) are required of an objective lens to achieve suitable optical properties for the respective types of disks. When a single objective lens is to be used for both DVDs and CDs, a desired optical pickup can be achieved by employing an objective lens configured to provide different NAs with respect to the respective wavelengths of laser light that are suitable for the respective types of disk.

When a signal is recorded on a disk using an optical disk recording and playback device, in order to identify the content of the signal recorded on the disk, after completion of a signal recording operation, some users place, on a surface opposite to a signal recording surface of the disk, a label or the like having information of the recorded content printed thereon, for example, song titles, when music is recorded, while other users write song titles or the like on the non-recording surface using a felt-tipped pen or the like.

However, there are some problems in that such methods including a step of placing a label or the like on a disk surface or of writing song titles or the like on a disk surface are inconvenient and can adversely affect the playback operation of the signal recorded on the disk. As a method to overcome such problems, a technique for forming a visible image on a photosensitive surface of an optical disk by means of laser light applied from an optical pickup has been developed.

However, currently known techniques remain problematic in that because a visible image is formed on a signal surface on which a data signal is recorded, when the recording capacity for data signals is large, the area for forming a visible image is reduced and it is usually impossible to display information sufficient to identify all recorded data. On the other hand, when the formation/recording of a visible image on an optical disk is performed on a surface opposite to the signal recording surface of the disk, there is another problem in that users must inconveniently turn the disk upside down after completion of a recording operation of data onto the disk.

SUMMARY OF THE INVENTION

According to one aspect of the present invention, there is provided an optical disk recording and playback device comprising a first laser driving circuit that supplies a driving signal to a first laser diode that emits laser light to be applied to a signal recording layer formed in an optical disk, a second laser driving circuit that supplies a driving signal to a second laser diode that emits laser light to be applied to an image recording layer formed in the optical disk, a signal recording pulse generating circuit that generates a signal recording pulse signal in accordance with a signal to be recorded on the signal recording layer, and outputs the signal recording pulse signal to the first laser driving circuit, and an image recording pulse generating circuit that generates an image recording pulse signal in accordance with a signal to form an image on the image recording layer, and outputs the image recording pulse signal to the second laser driving circuit, wherein, when recording of a signal to the signal recording layer and recording of an image to the image recording layer are simultaneously performed, the first laser diode and the second laser diode are configured to prevent light emission from simultaneously occurring at recording levels.

BRIEF DESCRIPTION OF THE DRAWINGS

A preferred embodiment of the present invention will be described in further detail based on the following drawings, wherein.

DESCRIPTION OF PREFERRED EMBODIMENT

An optical disk recording and playback device according to an embodiment of the present invention is configured to be able to simultaneously perform recording operations onto a signal recording layer and an image recording layer formed in an optical disk through the use of an optical pickup in which two types of laser diodes are provided.

Figure 1:
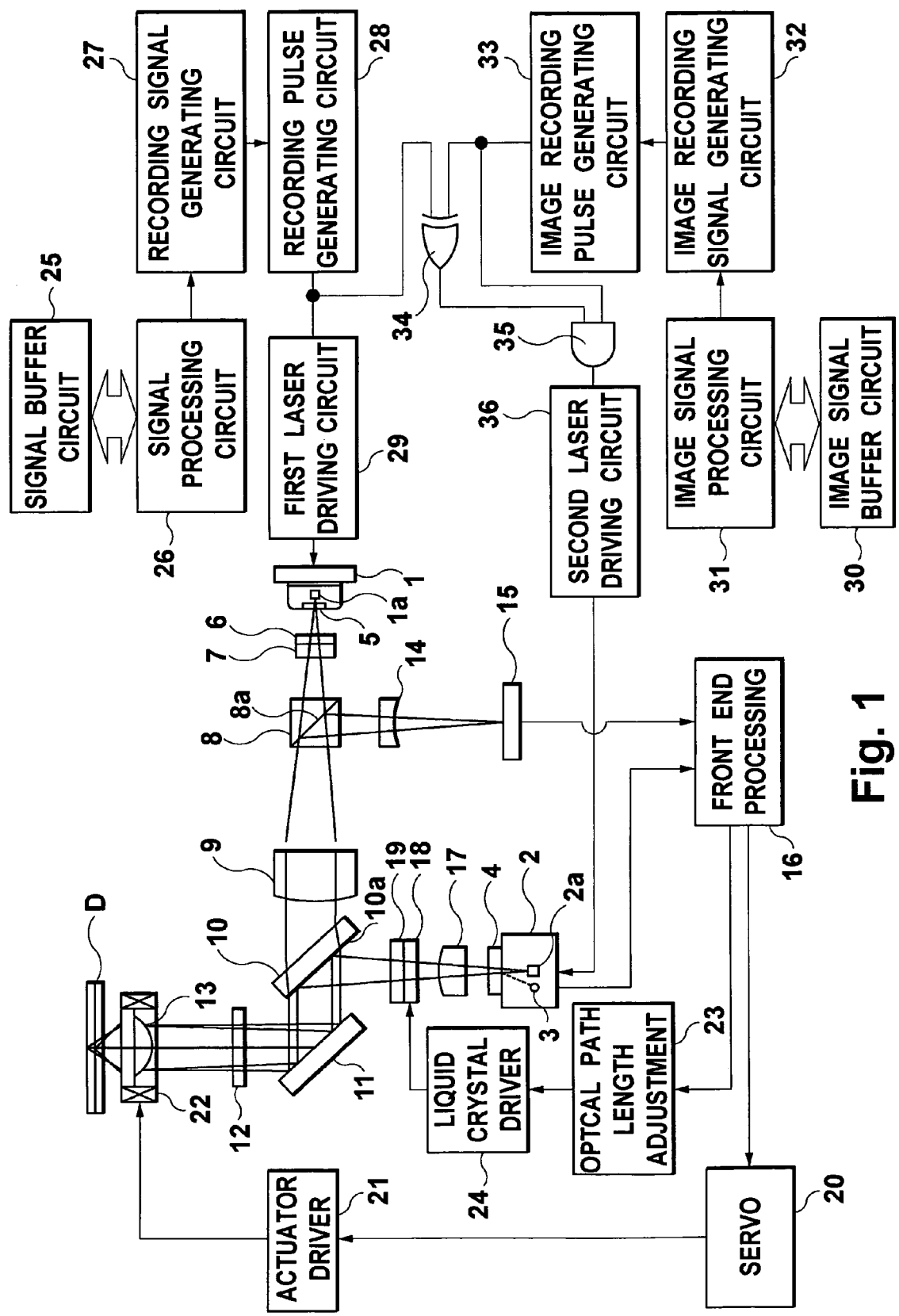
FIG. 1 is a block circuit diagram showing an example embodiment of an optical disk recording and playback device according to the present invention.

FIG. 1 is a block diagram showing an optical disk recording and playback device according to an embodiment of the present invention. An optical pickup as shown in FIG. 1 is configured to be used for both DVDs and CDs. The optical pickup is provided with a laser unit 1 including a first laser diode 1a that emits first laser light having a first wavelength in the red wavelength range of 645 nm to 675 nm, for example, a wavelength of 650 nm, which is suitable for DVDs, and is also provided with a light emission and detection unit 2 including a second laser diode 2a that emits second laser light having a second wavelength in the infrared wavelength range of 765 nm to 805 nm, for example, a wavelength of 780 nm, which is suitable for CDs.

In addition to the second laser diode 2a, the light emission and detection unit 2 includes a photodetector 3 that receives reflected light of the second laser light that is reflected by an optical disk D. The second laser diode 2a and the photodetector 3 are mounted within the same package. A hologram element 4 is disposed on an opening formed in this package, and functions as an optical path dividing element, in which an optical path dividing diffraction grating is formed, and through which reflected light of the second laser light is separated from an optical path of the second laser light emitted from the second laser diode 2a so that the separated light is guided to the photodetector 3. The optical path dividing diffraction grating is formed on a surface of the hologram element 4 on a side closer to the optical disk D. In addition, another diffraction grating for producing three beams that are to be used in tracking control is also formed on a surface of the hologram element 4 on a side closer to the second laser diode 2a.

The first laser light having the first wavelength that is emitted from the first laser diode 1a provided in the laser unit 1 is diffracted through a diffraction grating 6 provided in front of an opening 5 formed in the laser unit 1 to produce ±1st-order diffracted light for use in tracking control. After that, the diffracted light is adjusted through a ½ wave plate 7 to have a direction of polarization such that double refraction in a transparent substrate of the optical disk D is reduced.

The first laser light thus adjusted is incident on a polarization filter surface 8a of a polarization prism 8 in a transmission direction. This polarization filter surface 8a is configured to have the film characteristics of transmitting the first laser light with the direction of polarization adjusted through the ½ wave plate 7. Therefore, the first laser light passes through the polarization filter surface 8a of the polarization prism 8, and, after being collimated through a collimator lens 9, the collimated first laser light is incident on a parallel-plate-type beam splitter 10 in a transmission direction.

The beam splitter 10 serves to enable the laser unit 1 and the light emission and detection unit 2 to be arranged on different optical paths. A filter surface 10a, which functions as a reflective surface that reflects the second laser light emitted from the light emission and detection unit 2, has the wavelength selective characteristics of a dichroic filter. A selectively transmissive and reflective coating having the properties of transmitting almost all of the first laser light of 650 nm, and of reflecting almost all of the second laser light of 780 nm is provided on the filter surface 10a.

Thus, the first laser light emitted from the first laser diode 1a passes through the beam splitter 10, and is then reflected by a reflect mirror 11 so that the optical axis is bent at right angles. The first laser light reflected by the reflect mirror 11 passes through a wavelength selective ¼ wave plate 12, which effectively affects only 650 nm laser light, and the first laser light is incident on an objective lens 13, and is converged by the objective lens 13 to be applied to the optical disk D.

As described above, the first laser light emitted from the first laser diode 1a is applied to the optical disk D. The first laser light reflected by the optical disk D returns to the objective lens 13 to go back along the optical path, through which the laser light has passed, so that the first laser light again passes through the beam splitter 10, and is returned through the collimator lens 9 to the polarization prism 8.

Thus, because the first laser light returned to the polarization prism 8 has passed twice in a round trip to and from the optical disk D through the wavelength selective ¼ wave plate 12 that effectively affects only the first laser light, the direction of polarization is rotated by half the wavelength. Therefore, the first laser light, which is p-polarized when going to the optical disk D, is converted to s-polarized light, which in turn enters the polarization prism 8. As a result, the first laser light returned to the polarization prism 8 is reflected by the polarization filter surface 8a, and is guided to a photodetector 15 through an anamorphic lens 14 that provides an astigmatism component for generating a focus error component.

The photodetector 15 has a light receiving surface that is divided into a plurality of light receiving areas, and is configured to receive the first laser light reflected by the optical disk D. As such a configuration is well known in the art, a further description thereof is not provided herein. It is to be noted that the photodetector 15 is configured to output a signal for producing a playback signal of a signal recorded on the optical disk D, a focusing control signal and a tracking control signal, and a tilt control signal based on signals obtained from the light receiving areas.

A front end processing circuit 16 is configured such that, in response to signals obtained from the photodetector 15, operations are performed on the input signals to thereby produce a playback signal, a focusing control signal and a tracking control signal, and a tilt control signal.

On the other hand, the second laser light emitted from the second laser diode 2a is divided into three beams through the hologram element 4, and is emitted from the light emission and detection unit 2. After the angle of divergence is adjusted through a divergent lens 17, the second laser light further passes through a liquid crystal lens 18 and a ½ wave plate 19, and is applied to the filter surface 10a of the beam splitter 10.

The second laser light applied to the filter surface 10a of the beam splitter 10, in which the optical axis is changed by the filter surface 10a, is then reflected by the bend-up mirror 11 so that the optical axis is bent in a direction at right angles to the surface of the optical disk D. The second laser light reflected by the bend-up mirror 11 passes through the ¼ wave plate 12, and enters the objective lens 13. The second laser light converged by the objective lens 13 is applied to the optical disk D.

The objective lens 13 is provided with a diffraction grating (not shown) on an incident surface. A combination of this diffraction grating and the refraction produced by an aspheric shape of the objective lens 13 itself is configured to provide desired properties suitable for recording and playback of the respective types of disk with respect to the respective types of laser light having different wavelengths used for DVDs and CDs. In such a configuration, the first laser light suitable for DVDs is incident on a predetermined area in the form of collimated light, and the second laser light suitable for CDs is incident on a predetermined area with a predetermined angle of divergence. Thus, the objective lens 13 is configured to provide suitable NAs and aberration-corrected laser spots for recording and playback of a DVD and a CD, respectively.

The second laser light reflected by a signal surface of the optical disk D returns to the objective lens 13, and is further returned through the ¼ wave plate 12 and the bend-up mirror 11 to the beam splitter 10. The second laser light returned to the beam splitter 10 is reflected on the filter surface 10a, and passes through the ½ wave plate 19, the liquid crystal lens 18, and then the divergent lens 17 before being returned to the light emission and detection unit 2. The second laser light thus returned to the light emission and detection unit 2, whose optical axis is bent by the hologram element 4, is applied to the photodetector 3.

The photodetector 3 has a light receiving surface that is divided into a plurality of light receiving areas, and is configured to receive the second laser light reflected by the optical disk D. As such a configuration is well known in the art, a further description thereof is not provided herein. It is to be noted that the photodetector 3 is configured to output a signal for use in generating a playback signal of a signal recorded on the optical disk D, a focusing control signal and a tracking control signal, and a tilt control signal based on signals obtained from the light receiving areas. Because the signals produced by the photodetector 3 are input to the front end processing circuit 16, the front end processing circuit 16 is configured to perform operations on the input signals to thereby produce a playback signal, a focusing control signal and a tracking control signal, and a tilt control signal.

By arranging the liquid crystal to concentrically change the degree of phase change in a step-by-step manner, the liquid crystal lens 18 is configured to have an action of a lens although this action is extremely small.

Figure 2:
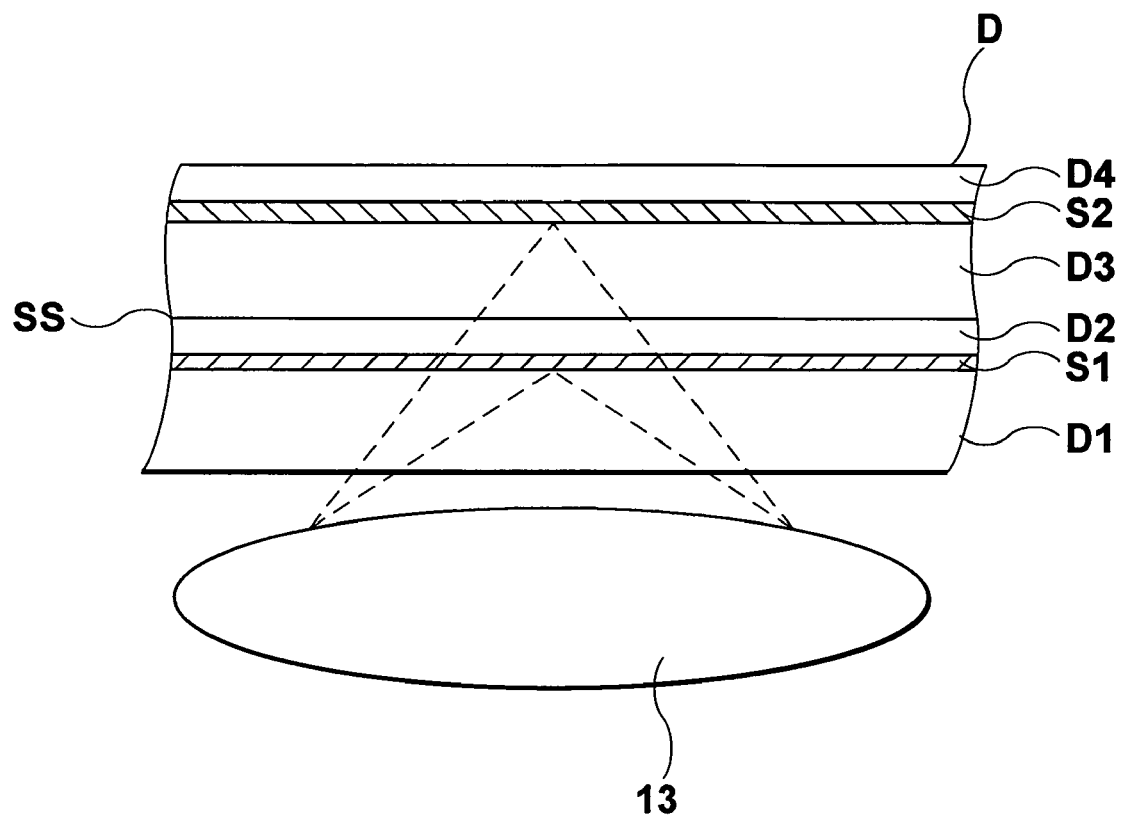
FIG. 2 is a cross-sectional diagram showing an example embodiment of an optical disk according to the present invention.

Next, a relationship between the optical disk D and the objective lens 13 as used in the present invention will be described with reference to FIG. 2. As shown in FIG. 2, the optical disk D has a first transparent protective layer D1, a signal recording layer S1, a second transparent protective layer D2, a third transparent protective layer D3, an image recording layer S2, and a fourth transparent protective layer D4 formed, in that order, from an incident surface side on which the first laser light and the second laser light converged by the objective lens 13 are to be incident.

In this structure, the first laser light converged by the objective lens 13 is focused on the signal recording layer S1, and the second laser light converged by the objective lens 13 is focused on the image recording layer S2. In this optical disk D, the signal recording layer S1 is located at a position defined by the standards of DVDs as measured from the laser light incident surface, and the image recording layer S2 is located at a position defined by the standards of CDs as measured from the laser light incident surface. The optical disk D is manufactured by bonding together a first disk consisting of the first transparent protective layer D1, the signal recording layer S1, and the second transparent protective layer D2, and a second disk consisting of the third transparent protective layer D3, the image recording layer S2, and the fourth transparent protective layer D4, with an adhesive SS.

Next, control of the optical pickup performed with respect to the optical disk D having the above-described structure will be described below. In the block diagram shown in FIG. 1, a servo circuit 20 performs various types of control operations based on various types of control signals produced by the front end processing circuit 16.

In other words, the servo circuit 20 is configured such that, when one of recording of a signal onto the signal recording layer S1 provided in accordance with the DVD standards, and playback (reproduction) of a signal recorded on the signal recording layer S1, is performed, various types of servo signals are produced based on various types of control signals, or more specifically, a focus control signal, a tracking control signal, and a tilt control signal, that are produced by the front end processing circuit 16 based on signals obtained from the photodetector 15.

Further, the servo circuit 20 is configured such that, when recording of an image signal onto the image recording layer S2 provided in accordance with the CD standards is performed, various types of servo signals are produced based on various types of control signals, or more specifically, a focus control signal and a tracking control signal, that are produced by the front end processing circuit 16 based on signals obtained from the photodetector 3.

An actuator driver circuit 21 receives various types of control signal that are generated and output from the servo circuit 20, and provides actuating signals to various types of actuating coils 22 that are provided in order to change the position of the objective lens 13 in the focus adjustment direction, in the tracking adjustment direction, and in the tilt adjustment direction.

When recording/playback is performed on the signal recording layer S1 of the optical disk D, control of the optical pickup, or more specifically, focus control, tracking control, and tilt control, are performed with respect to the signal recording layer S1 based on various types of control signal generated from the front end processing circuit 16 based on signals obtained from the photodetector 15. Similarly, when recording is performed on the image recording layer S2 of the optical disk D, control of the optical pickup, or more specifically, focus control and tracking control, are performed with respect to the image recording layer S2 based on various types of control signal generated from the front end processing circuit 16 based on signals obtained from the photodetector 3.

Further, when recording of a signal onto the signal recording layer S1 and recording of a signal onto the image recording layer S2 are simultaneously performed, various types of control operation of the optical pickup as described above are configured to be performed with respect to the signal recording layer S1. In addition, through such focus control performed with respect to the signal recording layer S1, while the first laser light is being focused on the signal recording layer S1, the second laser light can be focused on the image recording layer S2 by precisely setting the positional relationship of the optical system.

Thus, by precisely designing the optical system, even when only focus control with respect to the signal recording layer S1 is performed, it is possible to perform a focus operation with respect to the image recording layer S2 to the extent that the recording operation can be performed without any problems. However, by controlling the liquid crystal lens 18 through the use of an optical path length adjustment circuit 23 and a liquid crystal driver circuit 24, more accurate focus control can be performed.

When focus control is being performed to focus the first laser light emitted from the first laser diode 1a onto the signal recording layer S1, signals obtained by the photodetector 3 provided within the light emission and detection unit 2 are in a state to be input to the front end processing circuit 16, and a focus error signal for the second laser light with respect to the image recording layer S2 is generated from the front end processing circuit 16.

When such a focus error signal is input to the optical path length adjustment circuit 23, the optical path length adjustment circuit 23 outputs an adjustment signal to the liquid crystal driver circuit 24. When the adjustment signal is input to the liquid crystal driver circuit 24, the liquid crystal driver circuit 24 provides a drive signal to the liquid crystal lens 18. As a result of supplying a drive signal from the liquid crystal driver circuit 24 to the liquid crystal lens 18, the liquid crystal lens 18 provides the action of a concave lens to perform an adjustment operation in a direction that reduces the focus error signal. By performing such control, focus control with respect to the image recording layer S2 can be performed independently of focus control with respect to the signal recording layer S1.

Focus control with respect to the image recording layer S2 is performed such that, by setting the strength of refraction of a concave lens achieved by the liquid crystal lens 18 for each optical disk in consideration of the response speeds of liquid crystal elements provided within the liquid crystal lens 18, even though wobbling of an optical disk cannot be accommodated, it is possible to accommodate variations in thickness error among optical disks. Further, by setting the power strength of the action of a concave lens of the liquid crystal lens 18 for each predetermined position in the direction of the radius on an optical disk, it is possible to accommodate warping of an optical disk in the direction of the radius of the disk.

The optical pickup of the present invention is controlled in a manner described above. Next, circuitry for recording signals will be described below.

Referring to FIG. 1, a signal buffer circuit 25 comprises a RAM or the like for temporarily storing a recording signal that is output from a host device, such as a personal computer or the like, and that is to be recorded onto the signal recording layer S1. A signal processing circuit 26 controls operations for storing the recording signal in the signal buffer circuit 25 and reading the recording signal stored in the signal buffer circuit 25.

A recording signal generating circuit 27 receives the recording signal output from the signal processing circuit 26, and performs encoding processing in accordance with the standard of the signal to be recorded onto the signal recording layer S1, that is, the DVD standard. A recording pulse generating circuit 28 receives the recording signal output from the recording signal generating circuit 27, and generates a recording pulse signal conforming to the DVD standard. A first laser driving circuit 29 receives the recording pulse signal generated from the recording pulse generating circuit 28, and supplies a driving signal corresponding to the input recording pulse signal to the first laser diode 1a.

An image signal buffer circuit 30 comprises a RAM or the like for temporarily storing an image recording signal that is output from a host device and that is to be recorded onto the image recording layer S2. An image signal processing circuit 31 controls operations for storing the image recording signal in the image signal buffer circuit 30 and reading the image recording signal stored in the image signal buffer circuit 30.

An image recording signal generating circuit 32 receives the image recording signal output from the image signal processing circuit 31, and performs encoding processing in accordance with the standard of the signal to be recorded onto the image recording layer S2, that is, the CD standard. An image recording pulse generating circuit 33 receives the image recording signal output from the image recording signal generating circuit 32, and generates an image recording pulse signal conforming to the CD standard.

An exclusive OR circuit 34 receives the recording pulse signal output from the recording pulse generating circuit 28 and the image recording pulse signal output from the image recording pulse generating circuit 33. An AND circuit 35 receives an output signal output from the exclusive OR circuit 34 and the image recording pulse signal output from the image recording pulse generating circuit 33. A second laser driving circuit 36 receives the recording pulse signal output from the AND circuit 35, and supplies a driving signal corresponding to the recording pulse signal to the second laser diode 2a.

Each of the signal recording layer S1 and the image recording layer S2 provided in the optical disk D has a meandering groove called a pregroove formed therein, and by employing the above-described structure, a synchronization signal or positional information data can be extracted from a wobble signal obtained from this pregroove. The rotation speed control, signal processing, a search for a recording start position, and the like of the optical disk D are performed using the extracted synchronization signal or positional information data. In addition, signal tracks formed in the signal recording layer S1 and the image recording layer S2 are associated so that the signal track of the image recording layer S2 for low density recording is located at a position corresponding to that of the signal track of the signal recording layer S1 for high density recording.

Next, operations of the optical disk recording and playback device will be described. First, an operation for recording a DVD standard signal to the signal recording layer S1 provided in the optical disk D will be described below.

When an instruction signal for performing a recording operation only on the signal recording layer S1 is output from a host device to the optical disk recording and playback device, a system control circuit (not shown) incorporated in the optical disk recording and playback device functions to switch the circuits and the like included in the optical disk recording and playback device to a state for performing a recording operation. A driving signal is supplied from the first laser driving circuit 29 to the first laser diode 1a, but this driving signal is at a level at which laser light for performing a playback operation is emitted, and has no influence on a signal of the signal recording layer S1 of the optical disk D.

The first laser light emitted from the first laser diode 1a passes through the above-described optical path, and is applied to the signal recording layer S1 of the optical disk D. Although the first laser light is applied to the signal recording layer S1, the first laser light reflected from the signal recording layer S1 passes through the above-described optical path, and is applied to the photodetector 15.

When the first laser light reflected from the signal recording layer S1 of the optical disk D is applied to the photodetector 15, signals for use in producing a focus control signal, a tracking control signal, and a tilt control signal are generated from the photodetector 15, and are input to the front end processing circuit 16. When these signals are input to the front end processing circuit 16, the front end processing circuit 16 outputs, to the servo circuit 20, a focus control signal, a tracking control signal, and a tilt control signal.

When the focus control signal, the tracking control signal, and the tilt control signal are input to the servo circuit 20, the servo circuit 20 outputs, to the actuator driver circuit 21, control signals for performing control operations. As a result, actuating signals are supplied from the actuator driver circuit 21 to respective coils that form the actuating coils 22 incorporated in the optical pickup.

By supplying the actuating signals from the actuator driver circuit 21 to the coils incorporated in the actuating coils 22, or more specifically, a focusing coil, a tracking coil, and a tilt coil, the focus control for focusing the first laser light onto the signal recording layer S1, the tracking control for causing the first laser light to follow the signal track formed in the signal recording layer S1, and the tilt control for controlling the angle of the first laser light with respect to the signal recording layer S1 can be performed.

By performing such control operations, a signal recorded using the pregroove in the signal recording layer S1 can be read therefrom. A synchronization signal extracted from the read signal can be used to control the optical disk D to rotate at, for example, a constant linear speed. Further, positional information data extracted from the read signal can be used to move the position of application of the first laser light to a position from which a signal recording operation is to be started. These control operations can be performed in accordance with well-known search techniques, and therefore explanations thereof are not provided herein.

During a period when such control operations are performed, a DVD standard recording signal transmitted from a host device is held stored in the signal buffer circuit 25 under control of the signal processing circuit 26. Then, at a point in time when the first laser light reaches the start position of a recording operation, a reading operation of the recording signal stored in the signal buffer circuit 25 starts to be performed. The read recording signal is input to the recording signal generating circuit 27.

When the recording signal is input to the recording signal generating circuit 27, the recording signal generating circuit 27 performs an encoding operation to thereby generate a recording signal in units of blocks conforming to the DVD standard. The generated recording signal conforming to the DVD standard that is generated through the encoding operation performed by the recording signal generating circuit 27 is input to the recording pulse generating circuit 28.

Figure 3:
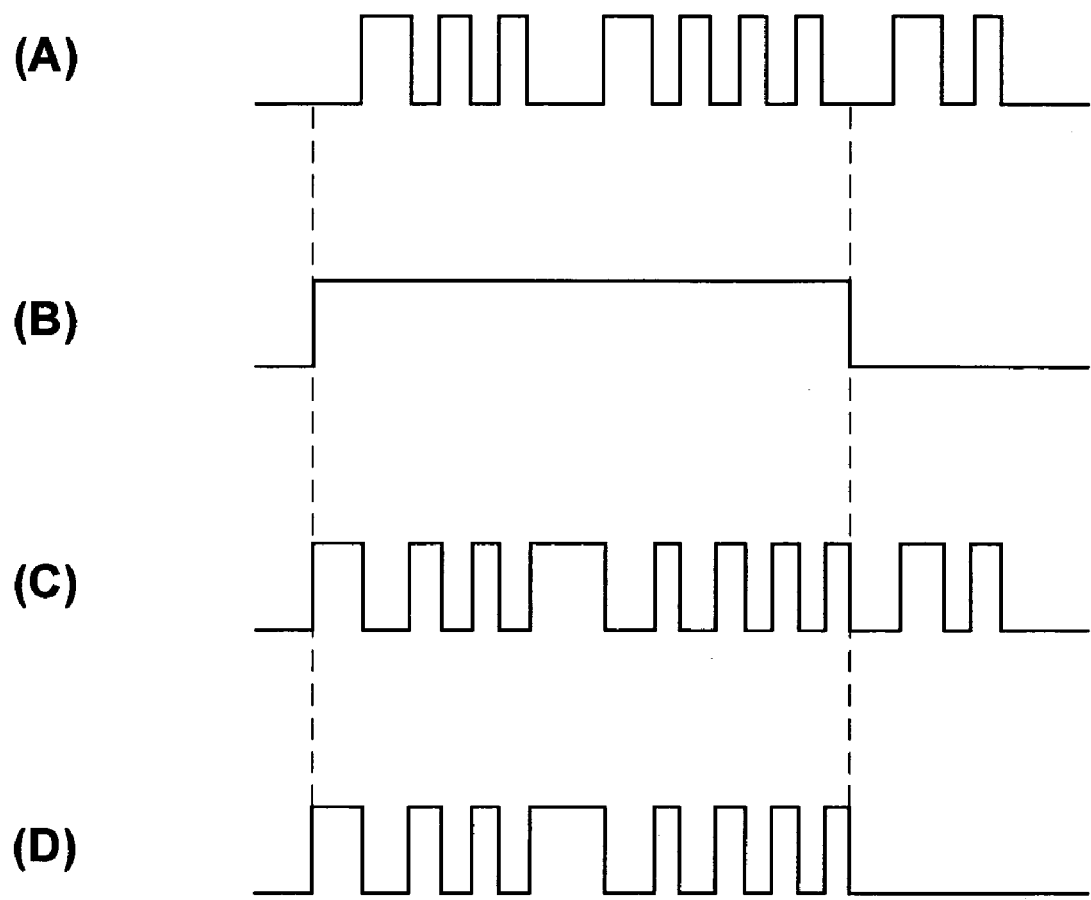
FIG. 3 is a signal waveform diagram for explaining the operation of the present invention.

When the recording signal is input to the recording pulse generating circuit 28, the recording pulse generating circuit 28 performs a recording pulse signal generating operation to generate and output a recording pulse signal as shown in FIG. 3(A). This recording pulse signal is input to the first laser driving circuit 29.

When the recording pulse signal is input to the first laser driving circuit 29, the first laser driving circuit 29 supplies, to the first laser diode 1a, a driving signal for causing emission of the first laser light having a recording level set in accordance with the recording characteristics of the signal recording layer S1 of the optical disk D. Because this driving signal is set to have a level corresponding to the recording pulse signal shown in FIG. 3(A), a signal varying in accordance with changes in the recording pulse signal is recorded to the signal recording layer S1. Thus, a recording operation of a signal conforming to the DVD standards can be performed on the signal recording layer S1.

The recording of a DVD standard signal to the signal recording layer S1 provided in the optical disk D is performed as described above. Next, an operation for recording a CD standard signal to the image recording layer S2 to thereby form an image thereon will be described below.

When an instruction signal for performing a recording operation of an image signal only on the image recording layer S2 is output from a host device to the optical disk recording and playback device, a system control circuit (not shown) incorporated in the optical disk recording and playback device functions to switch the circuits and the like to a state for performing a recording operation of an image. A driving signal is supplied from the second laser driving circuit 36 to the second laser diode 2a. However, this driving signal is at a level at which laser light for performing a playback operation is emitted, and has no influence on a signal of the image recording layer S2 of the optical disk D.

The second laser light emitted from the second laser diode 2a passes through the above-described optical path, and is applied to the image recording layer S2 of the optical disk D. Thus, the second laser light is applied to the image recording layer S2, and the second laser light reflected from the image recording layer S2 passes through the above-described optical path, and is applied to the photodetector 3.

When the second laser light reflected from the image recording layer S2 of the optical disk D is applied to the photodetector 3, signals for use in producing a focus control signal and a tracking control signal are generated from the photodetector 3, and are input to the front end processing circuit 16. When these signals are input to the front end processing circuit 16, the front end processing circuit 16 outputs, to the servo circuit 20, a focus control signal and a tracking control signal.

When the focus control signal and the tracking control signal are input to the servo circuit 20, the servo circuit 20 outputs, to the actuator driver circuit 21, control signals for performing control operations. As a result, actuating signals are supplied from the actuator driver circuit 21 to respective coils that form the actuating coils 22 incorporated in the optical pickup.

By supplying the actuating signals from the actuator driver circuit 21 to the coils incorporated in the actuating coils 22, or more specifically, a focusing coil and a tracking coil, the focus control for focusing the second laser light onto the image recording layer S2, the tracking control for causing the second laser light to follow the signal track formed in the image recording layer S2 can be performed.

By performing the above-described control operations, a signal recorded using the pregroove in the image recording layer S2 can be read therefrom. Therefore, a synchronization signal extracted from the read signal can be used to control the optical disk D to rotate at, for example, a constant linear speed. Further, positional information data extracted from the read signal can be used to move the position of application of the second laser light to a position from which a signal recording operation is to be started. These control operations can be performed in accordance with well-known techniques, and therefore explanations thereof are not provided herein.

During a period when the above-described control operations are performed, a CD standard image recording signal transmitted from a host device is held stored in the image signal buffer circuit 30 under control of the image signal processing circuit 31. Then, at a point in time when the second laser light reaches the start position of a recording operation, a reading operation of the image recording signal stored in the image signal buffer circuit 30 starts to be performed. The read image recording signal is input to the image recording signal generating circuit 32.

When the image recording signal is input to the image recording signal generating circuit 32, the image recording signal generating circuit 32 performs an encoding operation to thereby generate a recording signal in units of blocks conforming to the CD standard. The generated image recording signal conforming to the CD standard that is generated through the encoding operation performed by the image recording signal generating circuit 32 is input to the image recording pulse generating circuit 33.

When the image recording signal is input to the image recording pulse generating circuit 33, the image recording pulse generating circuit 33 performs an image recording pulse signal generating operation to generate and output an image recording pulse signal as shown in FIG. 3(B). The image recording pulse signal output from the image recording pulse generating circuit 33 is input to the exclusive OR circuit 34. In this structure, an "L" (low) level signal, that is, an output signal from the recording pulse generating circuit 28 is being input to another input terminal of the exclusive OR circuit 34.

Therefore, a pulse signal having a level identical to the level of the output signal from the image recording pulse generating circuit 33 is output from an output terminal of the exclusive OR circuit 34. The output signal from the exclusive OR circuit 34 and the image recording pulse signal output from the image recording pulse generating circuit 33 are input to the AND circuit 35, and the recording pulse signal having a waveform shown in FIG. 3(B) is output from an output terminal of the AND circuit 35. This recording pulse signal is input to the second laser driving circuit 36.

The recording pulse signal input to the second laser driving circuit 36 is an image recording pulse signal. In this structure, this image recording pulse signal is a pulse signal identical to the image recording pulse signal output from the image recording pulse generating circuit 33.

When this image recording pulse signal is input to the second laser driving circuit 36, a driving signal for causing emission of the second laser light having a recording level set in accordance with the recording characteristics of the image recording layer S2 of the optical disk D is supplied from the second laser driving circuit 36 to the second laser diode 2a. Because this driving signal is set to have a level corresponding to the image recording pulse signal shown in FIG. 3(B), a signal varying in accordance with changes in the image recording pulse signal is recorded to the image recording layer S2. By performing such control operations, a recording operation of a signal conforming to the CD standard can be performed on the image recording layer S2. By changing the recording position in accordance with an image to produce a pattern, a visible image can be formed in the image recording layer S2.

In cases where signals are recorded independently to the signal recording layer S1 and the image recording layer S2, control is performed as described above. Next, operations for cases where signal recording operations are simultaneously performed on the signal recording layer S1 and the image recording layer S2 will be described below.

Control of the optical pickup is performed with respect to the signal recording layer S1 on which a high density recording operation is performed. Focus control and tracking control with respect to the image recording layer S2 are performed through setting of the optical system, and better focus control can be achieved by adjusting the liquid crystal lens 18 by means of the optical path length adjustment circuit 23 and the liquid crystal driver circuit 24.

Further, because rotation control of the optical disk D is performed with respect to the signal recording layer S1, it is necessary to perform recording on the image recording layer S2 in accordance with the linear speed of rotation of the signal recording layer S1. A technique for performing signal processing in accordance with the recording speed is achieved by changing the frequency of a recording clock signal in accordance with the speed of a signal obtained from the image recording layer S2. This technique is well known in the art, and therefore explanations thereof are not provided herein.

In cases where simultaneous recording is performed on the signal recording layer S1 and the image recording layer S2, control of the optical pickup is performed as described above. Also, recording signal processing and generation by means of the signal buffer circuit 25, the signal processing circuit 26, and the recording signal generating circuit 27, and recording pulse signal generation by means of the recording pulse generating circuit 28 are performed as described above. Also, image recording signal processing and generation by means of the image signal buffer circuit 30, the image signal processing circuit 31, and the image recording signal generating circuit 32, and image recording pulse signal generation by means of the image recording pulse generating circuit 33 are performed as described above.

When processing and generation of respective signals are performed, a recording pulse signal having the waveform shown in FIG. 3(A) is output from an output terminal of the recording pulse generating circuit 28, and an image recording pulse signal having the waveform shown in FIG. 3(B) is output from an output terminal of the image recording pulse generating circuit 33.

Under such conditions, when the recording pulse signal and the image recording pulse signal respectively having the waveforms shown in FIGS. 3(A) and 3(B) are input to the exclusive OR circuit 34, a pulse signal having a waveform shown in FIG. 3(C) is output from the output terminal of the exclusive OR circuit 34. Then, the output signal from the exclusive OR circuit 34 and the image recording pulse signal generated from the image recording pulse generating circuit 33 are input to the AND circuit 35, and a recording pulse signal having a waveform shown in FIG. 3(D) is output from the output terminal of the AND circuit 35.

In cases where simultaneous signal recording is being performed on the signal recording layer S1 and the image recording layer S2, the recording pulse signal shown in FIG. 3(A) is input to the first laser driving circuit 29, and the recording pulse signal shown in FIG. 3(D) is input to the second laser driving circuit 36. Therefore, a driving signal corresponding to the recording pulse signal having the waveform shown in FIG. 3(A) is supplied from the first laser driving circuit 29 to the first laser diode 1a, and recording of the recording signal onto the signal recording layer S1 can be performed.

Further, because the recording pulse signal shown in FIG. 3(D) is supplied from the second laser driving circuit 36 to the second laser diode 2a, recording of the image signal onto the image recording layer S2 can be performed. During a period in which the image recording pulse signal shown in FIG. 3(B) has an "H"(high) level, the signal is recorded onto the signal recording layer S2 using a narrow width pulse signal generated in accordance with the recording pulse signal.

In the image recording layer S2 where a signal recording operation is performed at a low density, the signal recorded using the narrow width pulse signal is recorded in the form of a visible image. Even though the image forming operation is performed based on a short duration pulse signal, there is no adverse influence on the visible image.

As can be seen by comparing the recording pulse signal shown in FIG. 3(A) for use in recording of a signal onto the signal recording layer S1 and the recording pulse signal shown in FIG. 3(D) for use in recording of an image signal onto the image recording layer S2, there is a relationship such that, while one of the recording pulse signals has the "H" level, the other of the recording pulse signals has the "L" level. Therefore, the first laser diode 1a and the second laser diode 2a do not simultaneously perform emission operations at the "H" levels, that is, the recording levels.

Thus, in cases where simultaneous recording is performed on the signal recording layer S1 and the image recording layer S2, because the first laser diode 1a and the second laser diode 2a do not simultaneously emit laser light at high power, it is possible to prevent an increase in temperature of the optical pickup. Further, because reflected light for use in control of the optical system of the optical pickup is not adversely influenced by other laser light, the focus control, the tracking control, and the tilt control can be performed precisely.

Further, the first laser driving circuit 29 and the second laser driving circuit 36 that respectively supply a driving signal to the first laser diode 1a and the second laser diode 2a may be provided with a laser power automatic adjustment circuit that monitors the level of laser light emitted from the respective laser diodes to thereby keep the level within a predetermined level. In this structure, because the influence caused by other laser light can be prevented, the laser power can be adjusted precisely.

It is to be understood that, in the above-described example embodiment, a system of the DVD standard is used in a high density recording operation, and a system of the CD standard is used in a low density recording operation for forming an image, but the present invention is not limited to such an embodiment. Other types of standard can be employed within the scope of the present invention.

Further, although the above-described example embodiment is configured such that a signal obtained from the pre-groove formed in the image recording layer S2 is used in cases where a recording operation of an image signal is performed on the image recording layer S2, the present invention is not limited to such an embodiment. In the case of an optical disk recording and playback device configured such that recording of an image signal onto the image recording layer S2 is not performed separately, it is also possible to perform detection, control, and the like of the recording position with respect to the image recording layer S2 using positional information data obtained from the signal recording layer S1.

What is claimed is:

1. An optical disk recording and playback device that uses an optical disk provided with two recording layers including a signal recording layer and an image recording layer formed, in that order, from a light incident surface on which laser light is incident, the optical disk recording and playback device comprising an optical pickup incorporating a first laser diode and a second laser diode, wherein the first laser diode emits laser light to be applied to the signal recording layer, and the second laser diode emits laser light to be applied to the image recording layer, the optical disk recording and playback device further comprising:
    a first laser driving circuit that supplies a driving signal to the first laser diode;
    a second laser driving circuit that supplies a driving signal to the second laser diode;
    a signal recording pulse generating circuit that generates a signal recording pulse signal in accordance with a signal to be recorded on the signal recording layer, and outputs the signal recording pulse signal to the first laser driving circuit; and
    an image recording pulse generating circuit that generates an image recording pulse signal in accordance with a signal to form an image on the image recording layer, and outputs the image recording pulse signal to the second laser driving circuit, wherein
    when recording of a signal to the signal recording layer and recording of an image to the image recording layer are simultaneously performed, the first laser diode and the second laser diode are controlled to prevent light emission from simultaneously occurring at recording levels.

2. An optical disk recording and playback device according to claim 1, wherein
    when recording to the signal recording layer is performed in accordance with an output signal from the signal recording pulse generating circuit, and recording to the image recording layer is performed in accordance with an output signal from the image recording pulse generating circuit, an exclusive logical sum output of the output signal from the signal recording pulse generating circuit and the output signal from the image recording pulse generating circuit is supplied to the second laser driving circuit.

3. An optical disk recording and playback device according to claim 1, further comprising a focus servo circuit that performs focusing control of laser light emitted from the first laser diode to the signal recording layer, and performs focusing control of laser light emitted from the second laser diode to the image recording layer, wherein
    when recording of a signal is performed on the signal recording layer and the image recording layer, focus control is performed such that laser light emitted from the first laser diode is focused on the signal recording layer.

4. An optical disk recording and playback device according to claim 1, further comprising a focus servo circuit that performs focusing control of laser light emitted from the first laser diode to the signal recording layer, and performs focusing control of laser light emitted from the second laser diode to the image recording layer, wherein
    when the focus servo circuit performs focus control such that laser light emitted from the first laser diode is focused on the signal recording layer, laser light emitted from the second laser diode is focused on the image recording layer.

* * * * *